(12) United States Patent
Carrender

(10) Patent No.: US 7,009,515 B2
(45) Date of Patent: Mar. 7, 2006

(54) FREQUENCY-HOPPING RFID SYSTEM

(75) Inventor: Curtis Lee Carrender, Richland, WA (US)

(73) Assignee: Battelle Memorial Institute K1-53, Richland, WA (US)

(*) Notice: Subject to any disclaimer, the term of this patent is extended or adjusted under 35 U.S.C. 154(b) by 0 days.

(21) Appl. No.: 09/833,391

(22) Filed: Apr. 11, 2001

(65) Prior Publication Data

US 2002/0149484 A1  Oct. 17, 2002

(51) Int. Cl.
  *G08B 13/14* (2006.01)
(52) U.S. Cl. .............................. 340/572.1; 340/572.7; 340/10.1; 375/202
(58) Field of Classification Search ............ 340/572.1, 340/572.4, 572.7, 10.1, 10.4; 375/202; 455/189.1, 455/143
  See application file for complete search history.

(56) References Cited

U.S. PATENT DOCUMENTS

| 5,784,686 A | * | 7/1998 | Wu et al. ..................... 455/45 |
| 5,828,693 A | * | 10/1998 | Mays et al. .................. 375/202 |
| 5,937,065 A | * | 8/1999 | Simon et al. ................. 380/9 |
| 5,952,922 A | * | 9/1999 | Shober ....................... 340/572.4 |
| 5,974,078 A | * | 10/1999 | Tuttle et al. ................ 375/200 |
| 5,995,815 A | * | 11/1999 | Blom ......................... 455/189.1 |
| 6,107,910 A | * | 8/2000 | Nysen ........................ 340/10.1 |
| 6,175,726 B1 | * | 1/2001 | Sydon ........................ 455/209 |
| 6,375,780 B1 | * | 4/2002 | Tuttle et al. ................ 156/226 |

FOREIGN PATENT DOCUMENTS

WO  WO 96/27957  9/1996

* cited by examiner

*Primary Examiner*—Phung T. Nguyen
(74) *Attorney, Agent, or Firm*—Seed IP Law Group PLLC

(57) ABSTRACT

A radio-frequency identification (RFID) interrogator is provided that generates pseudo-randomly selected radio frequency interrogation signals for transmission on a first antenna and receives the reflected modulated radio-frequency signals via continuous-wave backscatter from a RFID tag device through a second antenna coupled to a heterodyne receiver where data is extracted. The RFID tag device can be configured to write data as well as have data read therefrom by the interrogator. The frequency-hopping transmission in combination with the heterodyne reception provides higher power levels with substantially reduced interference, as well as the ability to link with bounced signals at certain frequencies, increasing the level of communication in the RFID system.

21 Claims, 3 Drawing Sheets

FREQUENCY-HOPPING RFID SYSTEM

TECHNICAL FIELD

The present invention relates to RF identification (RFID) systems, and more particularly to RFID interrogators and tags that communicate using a frequency-hopping transmission technique and heterodyne reception.

BACKGROUND INFORMATION

Remote communication utilizing wireless equipment typically relies on radio frequency (RF) technology. One application of RF technology is in locating, identifying, and tracking objects, such as animals, inventory, and vehicles. RF identification (RFID) systems have been developed that facilitate monitoring of one or more remote objects.

As shown in FIG. 1, a basic RFID system 10 includes two components: a reader or interrogator 12, and a transponder (commonly called an RFID tag) 14. The interrogator 12 and RFID tag 14 include respective antenna circuits 16, 18. In operation, the interrogator 12 transmits through its antenna circuit 16 a radio frequency interrogation signal 20 to the antenna circuit 18 of the RFID tag 14. In response to receiving the interrogation signal 20, the RFID tag 14 produces a modulated radio frequency signal 22 that is reflected back to the interrogator 12 through the tag antenna 18 by a process known as continuous wave backscatter.

The substantial advantage of RFID systems is the non-contact, non-line-of-sight capability of the technology. The interrogator 12 emits the interrogation signal 20 with a range from one inch to one hundred feet or more, depending upon its power output and the radio frequency used. Tags can be read through a variety of substances such as odor, fog, ice, paint, dirt, and other visually and environmentally challenging conditions where bar codes or other optically-read technologies would be useless. RFID tags can also be read at high speeds, in most cases responding in less than one hundred milliseconds.

A typical RFID system 10 often contains a number of RFID tags 14 and the interrogator 12. RFID tags are divided into three main categories. These categories are beam-powered passive tags, battery-powered semi-passive tags, and active tags. Each operates in different ways.

The beam-powered RFID tag is often referred to as a passive device because it derives the energy needed for its operation from the interrogation signal beamed at it. The tag rectifies the energy field and changes the reflective characteristics of the tag itself, creating a change in reflectivity that is seen at the interrogator. A battery-powered semi-passive RFID tag operates in a similar fashion, modulating its RF cross-section in order to reflect a delta to the interrogator to develop a communication link. Here, the battery is the source of the tag's operational power for optional circuitry. The passive and semi-passive devices, or non-active devices, reflect the energy from the interrogation signal. In contrast, in an active RFID tag, a transmitter is used to generate its own radio frequency energy powered by the battery.

The range of communication for such tags varies according to the transmission power of the interrogator 12 and the RFID tag 14. Battery-powered tags operating at 2,450 MHz have traditionally been limited to less than ten meters in range. However, devices with sufficient power can reach up to 200 meters in range, depending on the frequency and environmental characteristics.

Spread-spectrum RFID systems utilize frequency-chipping transmitters that simultaneously generate a band of frequencies. One such system is disclosed in U.S. Pat. No. 5,974,078 by Tuttle et al. Because this system relies on frequency chipping, it is difficult to implement with passive backscatter RFID tags, instead requiring the use of powered RFID tags that generate their own radio-frequency signals.

In U.S. Pat. No. 5,828,693 issued to Mays et al., a spread spectrum system using a homodyne receiver to receive the reflected signals is disclosed. In order to avoid interference inherent with homodyne receivers, Mays et al. requires the use of a complicated detector circuit for detecting interference and a controller that operates to vary the frequency of the interrogation signal to avoid the detected interference. Moreover, this system dynamically adjusts the frequency only in response to interference. Mays et al. also requires the use of pre-defined frequency scanning envelopes to ensure compliance with federal regulations that limit power levels.

BRIEF SUMMARY OF THE INVENTION

The disclosed embodiments of the present invention are directed to a radio-frequency identification system and method that utilizes frequency hopping signal transmissions in RFID communications.

In accordance with a method of the present invention, pseudo-randomly selected radio-frequency signals are generated and transmitted from an interrogator, which then receives and extracts data from corresponding reflected radio-frequency signals from an RFID tag. The interrogator uses a heterodyne reception technique to receive and process the reflected signal. In accordance with one embodiment of the method, the heterodyne reception technique is a super-heterodyne technique. In accordance with another embodiment, the interrogator uses one antenna to transmit the pseudo-randomly selected radio-frequency signals and another antenna to receive the reflected radio-frequency signals.

A system of the present invention is provided that includes an RF interrogator using a frequency-hopping source to generate and transmit interrogation signals at pseudo-randomly selected frequencies and a heterodyne receiver to receive modulated radio-frequency signals reflected by a non-active RFID tag and extract data therefrom. In accordance with one embodiment of the system, the interrogator employs a single antenna to transmit and receive the radio-frequency signals. In accordance with another embodiment the interrogator employs separate antennas to receive and transmit the radio-frequency signals.

BRIEF DESCRIPTION OF THE DRAWINGS

The foregoing features and advantages of the present invention will be discussed in detail in the following non-limiting description of specific embodiments in connection with the accompanying drawings, wherein.

DETAILED DESCRIPTION OF THE INVENTION

Figure 2:
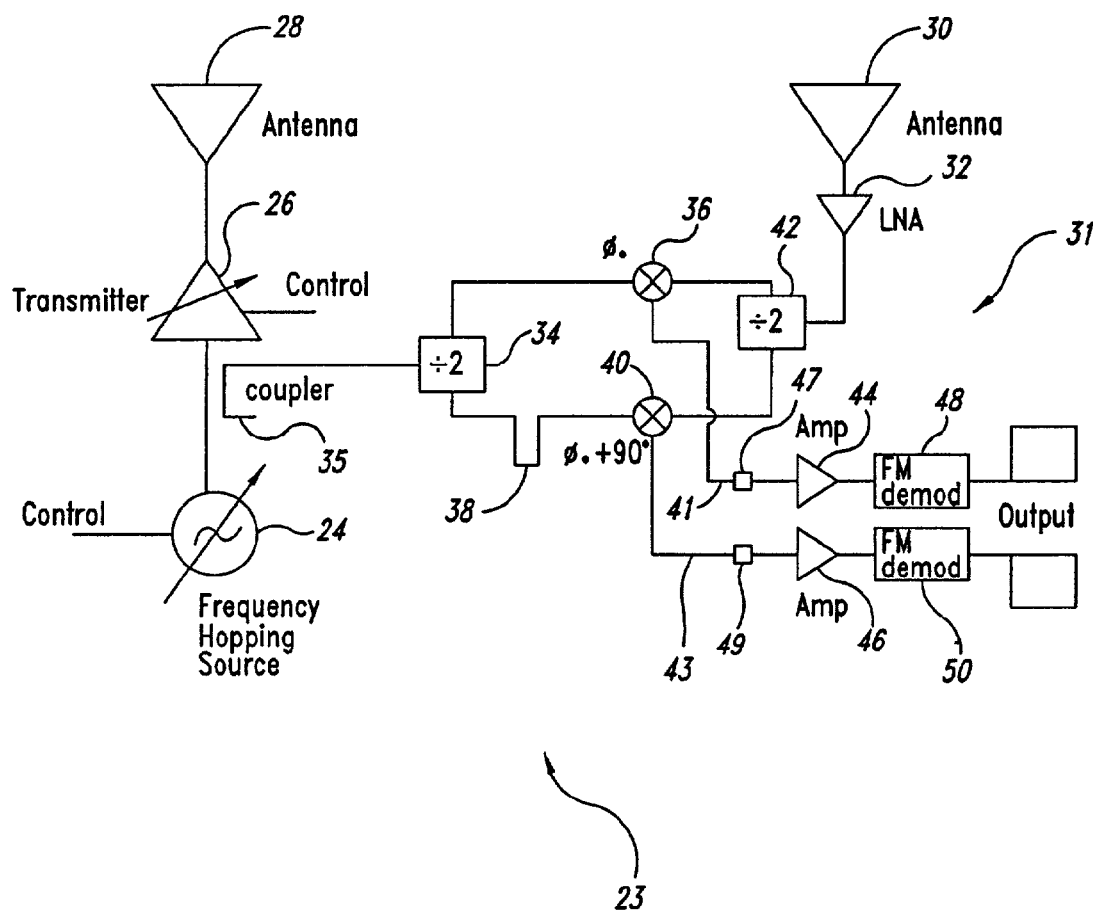
FIG. 2 is a schematic of a frequency-hopping RFID interrogator formed in accordance with one embodiment of the present invention.

Referring to FIG. 2, illustrated therein is one embodiment of a frequency-hopping RFID interrogator 23 of the present invention. The interrogator 23 includes a frequency-hopping source 24 structured to generate pseudo-randomly selected radio-frequency signals. In one embodiment, the pseudo-randomly selected radio-frequency signals are interrogation signals.

Because FCC regulations prohibit the transmission of randomly-generated RF signals, the frequency-hopping source 24 must generate RF signals that are pseudo-randomly selected. Current FCC regulations permit frequency-hopping transmissions at 902 MHz to 928 MHz and at 2.45 GHz and 5.8 GHz. Thus, the frequency-hopping source 24 can be configured to generate pseudo-random selected frequencies within the allowed frequency bands. One skilled in the art will recognize that other radio frequencies may be selected as permitted by law and the constraints of the particular implementation. In one embodiment, the frequency-hopping source 24 is configured to generate the pseudo-randomly selected frequency signals at regular time intervals. For example, the FCC allows no longer than 400 milliseconds of dwell time as per Part 15 unlicensed devices.

The frequency-hopping source 24 is readily commercially available and will not be described in detail herein. One skilled in the art will recognize that there are many ways of implementing the frequency-hopping source 24. For example, a digital controller (not shown) can be configured to generate a pseudo-random code that is converted to an analog signal by a digital-to-analog converter. The resulting analog signal can be used to control a voltage-controlled oscillator which generates the pseudo-randomly selected radio frequency signals.

In the embodiment depicted in FIG. 2, the frequency-hopping source 24 is electrically coupled to a transmitter 26 that in turn is electrically coupled to a first antenna 28. The transmitter 26 receives the pseudo-randomly selected radio-frequency signal from the frequency-hopping source 24 and amplifies the signal for transmission by the first antenna 28 in a known manner. The transmitter 26 may also modulate the signal in response to control signals. While FIG. 2 contemplates the use of frequency modulation, one skilled in the art will recognize that various other modulation schemes may be used, such as amplitude modulation and phase modulation.

Figure 1:
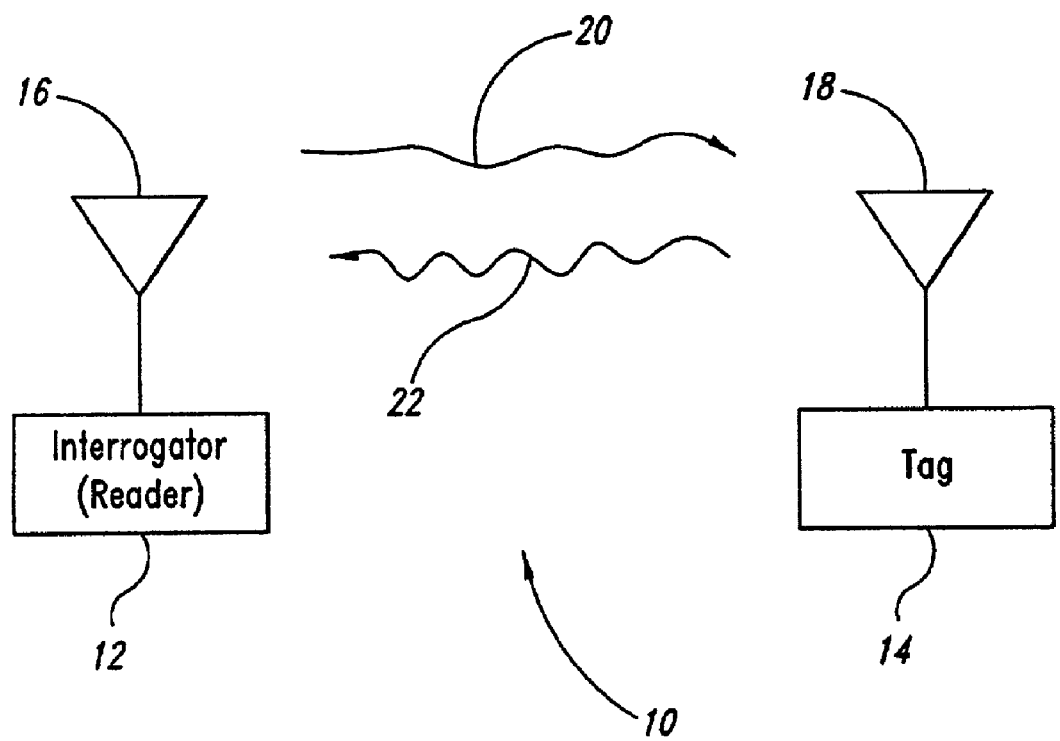
FIG. 1 is a diagram of an existing RFID tag system.

The transmitted signal is received by the RFID tag, such as at the antenna 18 of the RFID tag 14 (see FIG. 1). The RFID tag modulates and reflects the transmitted signal back to the interrogator 23. The reflected signal is received by a second antenna 30 associated with a heterodyne receiver 31 in the interrogator 23.

The heterodyne receiver 31 includes a low-noise amplifier 32 coupled to the second antenna; a first power divider 34 having an input connected between the frequency-hopping source 24 and the transmitter 26 via a microwave coupler 35; a second power divider 42 having an input coupled to the low-noise amplifier 32; and first and second mixers 36, 40 each having two inputs that are coupled to the first and second dividers 34, 42, to form first and second branches 41, 43, respectively.

It is to be understood that a signal divider could be used instead of the microwave coupler 35 to send a higher percentage of the generated signal to the first antenna 28 and divert a lower percentage to the receiver 31, such as a 90–10 split, respectively.

The first divider 34 receives the radio-frequency signal from the frequency-hopping source 24 through the coupler 35 and divides the divider in two. The output of the first divider 34 is coupled to a first input of the first mixer 36 and to a phase-shifter 38. The output of the phase-shifter 38 is coupled to a first input of a second mixer 40. The phase shifter is configured to shift the generated signal by 90 degrees or an odd multiple of 90 degrees to provide a second signal on the second branch 43 that is delayed. This enables reading of the reflected signal during quadrature nulls, which commonly occurs with continuous-wave backscatter RFID systems. It will be understood to those skilled in the art that a receiver could be constructed having more or less than two channels, including one, three, four, five, or six channels, or more as needed. The above-described embodiment shows two channels for illustrative purposes only.

The low-noise amplifier 32 is electrically coupled to an input of the second divider 42, which receives the amplified reflected radio-frequency signal and divides the signal in two. The output of the second divider 42 is electrically coupled to a second input of the first mixer 36 and to the second input of the second mixer 40. The output of the first mixer 36 is coupled to a first amplifier 44 through a first final down-conversion circuit 47; and the output of the second mixer 40 is coupled to a second amplifier 46 through a second final down-conversion circuit 49. The down-conversion circuits 47, 49 further process the signal to accomplish the heterodyne conversion in a manner well-known in the art. The first amplifier 44 is coupled to a first demodulator 48 and the second amplifier 46 is coupled to a second demodulator 50. In this embodiment, both demodulators 48, 50 are FM demodulators, although it is to be understood that the demodulators can be amplitude or phase demodulators as required. Data contained within the processed radio-frequency signal is provided at the outputs of the first demodulator 48 and the second demodulator 50.

Although FIG. 2 illustrates the use of a particular superheterodyne receiver, one skilled in the art will recognize that a heterodyne receiver may be used.

Figure 3:
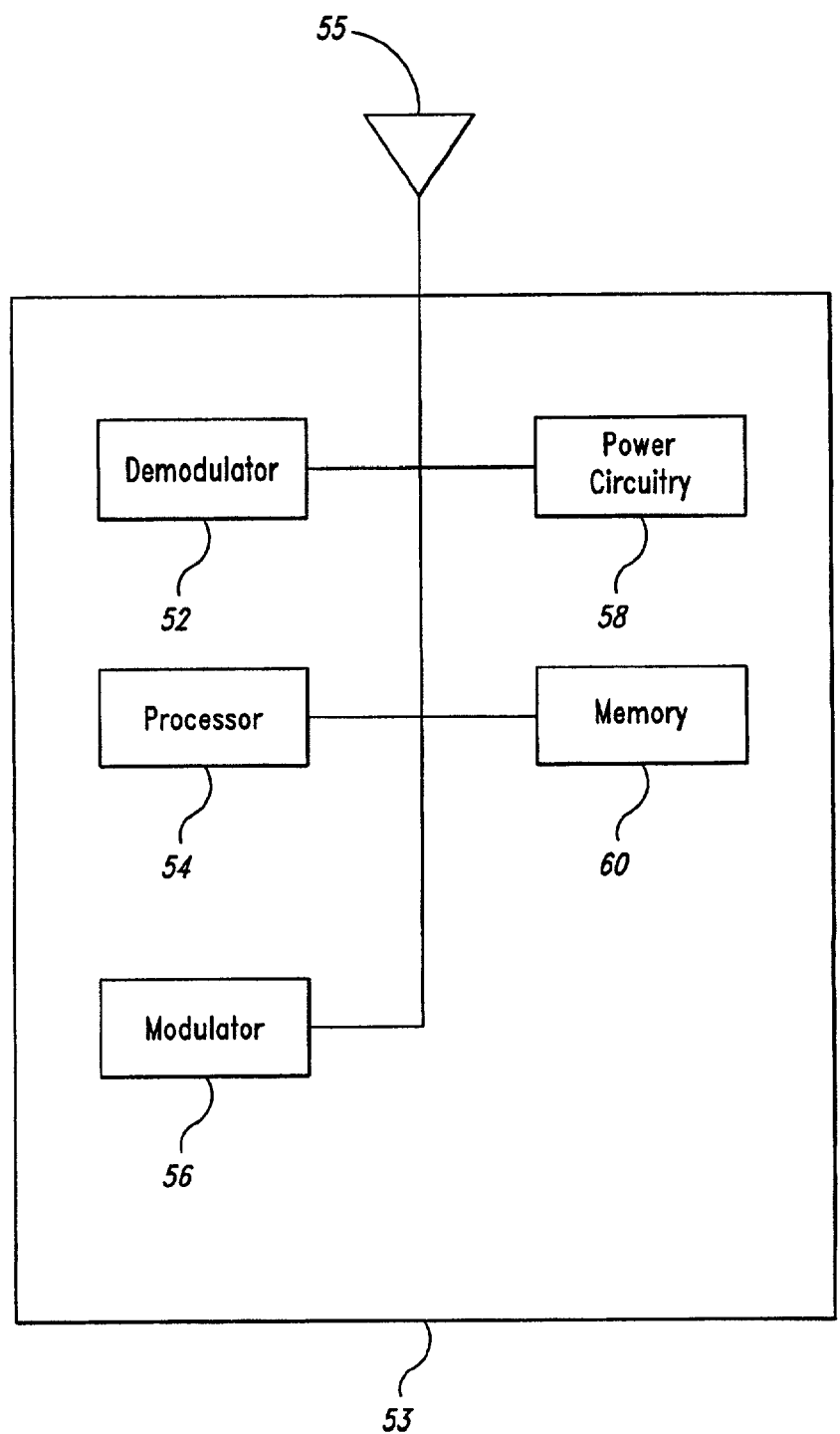
FIG. 3 is a diagram of an RFID tag formed in accordance with the present invention.

FIG. 3 is a diagram of an RFID tag 53 formed in accordance with one embodiment of the present invention. In this embodiment, the interrogator 23 transmits a pseudo-randomly selected radio-frequency signal that is received by the RFID tag antenna 55. The RFID tag antenna 55 is coupled to a demodulator 52, which receives the transmitted radio-frequency signal from the antenna 55 and extracts data contained therein. The demodulator 52 is coupled to a processor 54, which analyzes the data extracted from the radio frequency signal.

In one embodiment, the processor 54 is coupled to a memory 60 and the processor 54 generates control signals to store data in the memory 60 based on the data extracted from the transmitted radio-frequency signal. In another embodiment, the processor 54 is coupled to a modulator 56 and generates control signals to control the modulation of a reflected radio-frequency signal by the modulator 56, based on the data extracted from the received radio-frequency signal. The modulator 56 is coupled to the antenna 55 that then reflects the received radio-frequency signal as modulated by the modulator 56. In an exemplary embodiment, the processor 54 may generate control signals to store data in the memory and to control the modulator 56 based on data stored in the memory 60, data extracted from the transmitted radio-frequency signal, or some combination thereof. One skilled in the art will recognize that the RFID tag 53 may also contain other circuitry, including power circuitry 58, which may be passive, semi-passive or active.

The frequency-hopping system of the present invention is well suited for use in conjunction with a multi-frequency communication system and method developed by the applicant, as disclosed in U.S. patent application Ser. No. 09/589,000, filed on Jun. 6, 2000, entitled "Multi-Frequency Communication System and Method." Now U.S. Pat. No. 6,245,008, which is fully incorporated herein by reference.

CLOSURE

From the foregoing it will be appreciated that, although specific embodiments of the invention have been described herein for purposes of illustration, various modifications may be made without deviating from the spirit and scope of the invention. Accordingly, the invention is not to be limited except as by the appended claims.

I claim:

1. An FCC Part 15 compliant radio-frequency identification interrogator for use with a passive radio frequency identification (RFID) tag, the interrogator comprising:
    a frequency-hopping source configured to sequentially generate radio-frequency signals at pseudo-randomly selected frequencies within a frequency-band of 902 to 928 MHz;
    a transmitter coupled to the frequency-hopping source and to an antenna circuit and configured to transmit the generated radio-frequency signals on the antenna circuit;
    a heterodyne receiver coupled to the antenna circuit and configured to receive on the antenna circuit reflected radio-frequency signals from the RFID tag, the antenna circuit comprising a first antenna circuit having a first antenna and a second antenna circuit having a second antenna, and the transmitter configured to transmit the radio-frequency signals on the first antenna and the receiver configured to receive the reflected radio-frequency signals on the second antenna, the first antenna circuit coupled to the second antenna circuit by a divider circuit; and
    a signal processor coupled to the antenna circuit and to the heterodyne receiver, wherein the signal processor is configured to receive the reflected radio-frequency signals and to extract data contained within the reflected radio-frequency signals that correspond to the frequency of the transmitted radio-frequency signals.

2. The interrogator of claim 1, wherein the heterodyne receiver comprises a super-heterodyne receiver.

3. The interrogator of claim 1, further comprising a low-noise amplifier coupled to the second antenna and to the heterodyne receiver, wherein the low-noise amplifier is configured to amplify the received reflected radio-frequency signals.

4. The interrogator of claim 1, wherein the frequency-hopping source is configured to sequentially generate radio-frequency signals at regular time intervals.

5. The interrogator of claim 1, wherein the transmitter is configured to modulate the pseudo-randomly selected radio-frequency signals.

6. The interrogator of claim 1, wherein the heterodyne receiver comprises:
    a first down conversion circuit coupled to a first FM demodulator; and
    a second down conversion circuit coupled to a second FM demodulator.

7. The interrogator of claim 6, wherein the heterodyne receiver further comprises a microwave coupler providing a radio-frequency signal from the frequency-hopping source.

8. A remote communication method for use with an FCC Part 15 compliant radio-frequency identification (RFID) system having an RFID interrogator and a non-active RFID tag device, the method comprising:
    sequentially generating radio-frequency signals at pseudo-randomly selected frequencies in a frequency range of 902 MHz to 928 MHz using a frequency-hopping source in the RFID interrogator;
    transmitting on a first antenna the radio-frequency signals from the RFID interrogator;
    modulating the pseudo-randomly selected radio-frequency signals;
    extracting data from the modulated, transmitted radio-frequency signals at the RFID tag device;
    storing data in the RFID tag device based on the data extracted at the RFID tag device;
    reflecting the transmitted radio-frequency signals at the RFID tag device;
    receiving on a second antenna coupled to the first antenna by a divider circuit reflected radio-frequency signals from the RFID tag device using a heterodyne reception technique; and
    extracting data contained within the reflected radio-frequency signals that correspond to the frequency of the transmitted radio-frequency signals.

9. The method of claim 8, wherein the heterodyne reception technique is a super-heterodyne reception technique.

10. The method of claim 8, further comprising amplifying the received reflected radio-frequency signals using a low-noise amplifier.

11. The method of claim 8, wherein the sequentially generated radio frequency signals are generated at regular time intervals.

12. The method of claim 8, further comprising:
    modulating the pseudo-randomly selected transmitted radio-frequency signals;
    extracting data from the modulated, transmitted radio-frequency signals at the RFID tag device; and
    modulating the reflected radio-frequency signal based on the data extracted at the RFID tag device.

13. A device for communicating with a remote, non-active radio-frequency identification (RFID) tag in compliance with FCC Part 15 regulations, comprising:
    means for sequentially generating radio-frequency signals at pseudo-randomly selected frequencies in a frequency range of 902 MHz to 928 MHz using a frequency-hopping source of an RFID interrogator;
    means for transmitting the radio-frequency signals from the RFID interrogator on a first antenna;
    a heterodyne receiver configured to receive on a second antenna coupled to the first antenna by a divider circuit the radio-frequency signals that are reflected from the RFID tag; and
    means for extracting data contained within the reflected radio-frequency signals, the extracting means configured to receive the transmitted radio frequencies and to process data from the reflected radio-frequency signals that correspond to the frequency of the transmitted radio-frequency signals.

14. The device of claim 13, wherein the means for transmitting the radio-frequency signals comprise a first antenna and the heterodyne receiver comprises a second antenna.

15. The device of claim 14, further comprising a low-noise amplifier for amplifying the received reflected radio-frequency signals.

16. The device of claim 13, further comprising means for modulating the pseudo-randomly selected radio-frequency signals prior to transmission.

17. An FCC Part 15 compliant radio-frequency identification (RFID) system, comprising:
    an RFID device configured to reflect radio-frequency signals via continuous-wave backscatter and configured to store data based on data extracted from the radio-frequency signals;

an RFID interrogator configured to generate and transmit pseudo-randomly selected radio-frequency signal in a frequency range of 902 MHz to 928 MHz over time and to receive, using a heterodyne reception technique, modulated radio-frequency signals reflected from the RFID;

wherein the interrogator comprises:

a frequency-hopping source configured to sequentially generate radio-frequency signals at pseudo-randomly selected frequencies;

a transmitter coupled to a first antenna and configured to transmit the generated radio-frequency signals on the first antenna;

a heterodyne receiver coupled to a second antenna that is coupled to the first antenna by a divider, the receiver configured to receive on the second antenna the reflected radio-frequency signals from an RFID device; and a signal processor coupled to the first antenna to receive the transmitted radio-frequency signals and coupled to the heterodyne receiver to receive the reflected radio-frequency signals, wherein the signal processor is configured to extract data from the reflected radio-frequency signals that correspond to the transmitted radio-frequency signals.

18. The system of claim 17, wherein the interrogator comprises a frequency-hopping source configured to generate the pseudo-randomly selected radio-frequency signals.

19. The system of claim 17, wherein the RFID device comprises a passive RFID tag device.

20. The system of claim 17, wherein the interrogator is further configured to modulate the pseudo-randomly selected transmitted radio-frequency signals and the RFID device is further configured to extract data from the transmitted signals.

21. The system of claim 17, wherein the RFID device is further configured to modulate the reflected radio-frequency signal and the modulation is based on the extracted data.

* * * * *

UNITED STATES PATENT AND TRADEMARK OFFICE
CERTIFICATE OF CORRECTION

PATENT NO. : 7,009,515 B2  
APPLICATION NO. : 09/833391  
DATED : March 7, 2006  
INVENTOR(S) : Curtis Lee Carrender It is certified that error appears in the above-identified patent and that said Letters Patent is hereby corrected as shown below:

Title Page  
Item (56) References Cited, U.S. Patent Documents, should read as:

| | | | |
|---|---|---|---|
| 5,784,686 A | * | 12/1996 | Wu et al. ...........455/45 |
| 5,828,693 A | * | 3/1996 | Mays et al. .......375/202 |
| 5,937,065 A | * | 4/1997 | Simon et al. .........380/9 |
| 5,952,922 A | * | 12/1996 | Shober .........340/572.4 |
| 5,974,078 A | * | 2/1997 | Tuttle et al. .......375/200 |
| 5,995,815 A | * | 10/1997 | Blom ..........455/189.1 |
| 6,107,910 A | * | 8/2000 | Nysen ............340/10.1 |
| 6,175,726 A | * | 9/1996 | Sydon ............455/209 |
| 6,375,780 A | * | 4/2000 | Tuttle et al. ........156/226 |

Column 7  
Claim 17, line 2, "signal" should read as --signals--

Signed and Sealed this

Twenty-ninth Day of January, 2008

JON W. DUDAS  
*Director of the United States Patent and Trademark Office*